(12) United States Patent
Bertram et al.

(10) Patent No.: US 7,963,664 B2
(45) Date of Patent: Jun. 21, 2011

(54) LIGHTING DEVICE WITH OLEDS

(75) Inventors: Dietrich Bertram, Aachen (DE); Lingli Wang, Heeze (NL); Denis Joseph Carel Van Oers, Bocholt (BE); Johannes Petrus Maria Ansems, Hulsel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 283 days.

(21) Appl. No.: 12/293,301

(22) PCT Filed: Mar. 13, 2007

(86) PCT No.: PCT/IB2007/050838
§ 371 (c)(1),
(2), (4) Date: Sep. 17, 2008

(87) PCT Pub. No.: WO2007/107916
PCT Pub. Date: Sep. 27, 2007

(65) Prior Publication Data
US 2009/0046454 A1 Feb. 19, 2009

(30) Foreign Application Priority Data

Mar. 23, 2006 (EP) ..................... 06111640

(51) Int. Cl.
*F21V 5/00* (2006.01)
*F21V 7/00* (2006.01)
(52) U.S. Cl. ......... 362/231; 362/235; 362/297; 362/346
(58) Field of Classification Search .................. 362/231, 362/297, 346, 311.02, 249.05, 235
See application file for complete search history.

(56) References Cited

U.S. PATENT DOCUMENTS

| 5,255,171 | A  | * | 10/1993 | Clark ............................ 362/231 |
| 5,874,803 | A  |   | 2/1999  | Garbuzov et al. |
| 6,200,002 | B1 |   | 3/2001  | Marshall et al. |
| 6,547,416 | B2 | * | 4/2003  | Pashley et al. ................ 362/231 |
| 6,685,339 | B2 | * | 2/2004  | Daughtry et al. ......... 362/249.05 |
| 7,048,412 | B2 | * | 5/2006  | Martin et al. .................. 362/247 |
| 7,329,982 | B2 | * | 2/2008  | Conner et al. ................. 313/498 |
| 7,520,642 | B2 | * | 4/2009  | Holman et al. ............... 362/328 |
| 7,658,528 | B2 | * | 2/2010  | Hoelen et al. ................. 362/555 |
| 2002/0080622 | A1 |   | 6/2002 | Pashley et al. |
| 2004/0264185 | A1 | * | 12/2004 | Grotsch et al. ................ 362/231 |
| 2005/0067628 | A1 |   | 3/2005 | Kuwabara et al. |
| 2005/0205878 | A1 |   | 9/2005 | Kan |

FOREIGN PATENT DOCUMENTS

| DE | 202005009086 U1 | 11/2005 |
| DE | 102004042186 A1 | 3/2006 |
| WO | 03073525 A1 | 9/2003 |
| WO | 2004090416 A1 | 10/2004 |
| WO | 2005022030 A2 | 3/2005 |

OTHER PUBLICATIONS

Joseph Shinar, et al: Organic Light-Emitting Devices: A Survey, pp. 9-10,NY Springer-Verlag 2004.
Mullen et al Editors, Orgainc Light Emitting Devices: Synthesis, Properties and Application, pp. 16-18, 22, 2006.

\* cited by examiner

*Primary Examiner* — Stephen F Husar
*Assistant Examiner* — James W Cranson

(57) ABSTRACT

A lighting device with a light emitter includes OLEDs of at least two different primary colors. The light emitter is followed by a primary optics, e.g. a collimator or a lens, and a tapered tubular reflector with a diameter that increases from its narrow end to its wide end. The light emitter may include concentric rings of different OLEDs.

15 Claims, 4 Drawing Sheets

LIGHTING DEVICE WITH OLEDS

The invention relates to a lighting device with a light emitter comprising units of at least two different primary colors.

From the US 2002/0080622 A1 a lighting device is known which comprises an array of discrete light emitting diodes (LEDs) of different primary colors which are arranged at the bottom of a tapered tubular reflector. The reflector and some optional primary optics mix the colors of the LEDs and produce a directed, more or less narrow light beam. The color characteristics of such lighting devices shows however a relatively large variation across the light beam.

Based on this situation it was an object of the present invention to provide an improved lighting device with a higher homogeneity of the color distribution.

The lighting device according to the present invention comprises the following components:

A light emitter comprising organic light emitting diodes (OLEDs) of at least two different primary colors, i.e. with two different emission spectra. OLEDs typically consist of one or more organic layers, of which at least one can emit light, sandwiched between electrodes on substrates (e.g. Shinar, Joseph (Ed.), "Organic Light-Emitting Devices: A Survey", NY: Springer-Verlag (2004); Klaus Muellen, Ullrich Scherf (Eds.), "Organic Light Emitting Devices: Synthesis, Properties and Applications", John Wiley & Sons (2006)). It should be noted that the at least two different colors do not have to come from physically independent OLEDs, but may also originate from different regions with different emission of the same OLED, i.e. the same substrate but different stacks in different regions.

A primary optics for collimating and mixing light emitted by the aforementioned light emitter. The primary optics is typically disposed in close proximity to the light emitter in order to capture a maximal amount of emitted light.

A tapered tubular reflector with a diameter that increases from a narrow end to a wide end of the reflector, wherein the reflector is disposed with its narrow end adjacent to the primary optics. The central axis of the reflector tube is typically also the optical axis of the lighting device along which the main light emission takes place. Moreover, the lighting device is typically symmetrical with respect to that reflector axis, particularly symmetrical with respect to rotations about the reflector axis in steps of integer fractions of 360°.

With a lighting device of the aforementioned kind it is possible to achieve an excellent color mixing and a light beam that is directed in a desired direction. The device therefore solves one of the main problems in using OLEDs for general illumination, i.e. the non-directed emission of light according to Lambertian radiation from an emitting surface. This problem previously prevented an efficient use of OLEDs for many applications such as local illumination (spot lighting, table lighting, desk lighting, task lighting, etc.). A second problem of OLEDs for general illumination is color mixing. One previously known option in this respect was to make a patterned lamp with red, green and blue monochromic OLEDs positioned laterally. However, efficient color mixing puts restrictions on the 'pattern'-sizes, and with that on the complexity of the backplane. Although it is also possible to stack the monochromic OLEDs, this is cost ineffective. The lighting device proposed by the present invention solves also that second problem due to the excellent color mixing that can be achieved with it.

While the light emitter may in principle comprise just two OLEDs of two different colors, a larger range of colors can be produced if the light emitter comprises three or more OLEDs of different colors. If the colors of the different OLEDs are sufficiently distinct (e.g. with an emission peak at red, green and blue), a large color gamut can already be achieved with three OLEDs.

In a preferred embodiment of the invention, the light emitter comprises a blue OLED in its centre. In praxis it turns out that less surface area of blue OLEDs (compared with Red and Green) often suffices for mixing white light of many different color temperatures.

A particular advantage of a light emitter consisting of OLEDs is that its diameter can in principle be made as large as desired (wherein the diameter of an arbitrarily shaped light emitter is defined as the diameter of the largest circle that can completely be inscribed into the area of the light emitter), particularly larger than 1 millimeter.

In one particular embodiment of the invention, the light emitter covers a circular area, wherein said area preferably extends perpendicular to the reflector axis with its centre lying on said axis. Due to its symmetry, the circular area of the light emitter provides optimal conditions for a rotational symmetry of the generated light beam.

In the aforementioned case, the light emitter may preferably further comprise concentric rings of OLEDs of different colors. Such concentric rings optimally preserve the rotational symmetry of the light emitter. The diameter is of the rings can be adjusted to the required power contribution of each color.

The circular light emitter may also comprise sectors of OLEDs having different colors. The different colors may preferably be arranged in a periodic sequence along the circumference of the light emitter. A light emitter that is periodically composed of different sectors has an advantageous discrete rotational symmetry.

The aforementioned two designs can optionally be combined, e.g. by a light emitter having rings of OLED-sectors of different colors.

The primary optics that is used to enhance light extraction and/or to collimate may be realized in various different ways. Preferably it comprises a collimator or a lens, particularly a hemispherical lens.

In another preferred embodiment of the invention, the reflector has everywhere along its axis a cross section (said cross section being taken perpendicular to the axis) in the form of a regular polygon, preferably a polygon with at least five corners, most preferably a hexagon.

Moreover, the reflector may preferably be composed of planar facets.

The aforementioned facets are optionally arranged in rings or "belts" around the axis of the reflector, wherein the edges of neighboring belts superimpose. The number of belts arranged in a line preferably ranges between four and ten.

The height of the aforementioned belts (as measured in the direction of the reflector axis) preferably increases from the narrow end to the wide end of the reflector. If for example six belts are present, the ratios of their heights may be like 0.19:1.11:2.55:4.99:9.43:40.78.

Each facet of the reflector encloses a certain angle with the reflector axis, wherein said angle preferably ranges between 10° and 60°. It should be noted that all facets in one of the above-mentioned belts enclose the same angle with the reflector axis.

The angles between the facets of the reflector and the reflector axis preferably decrease from the narrow end to the wide end of the reflector. The reflector therefore has a kind of parabolic shape in a plane that comprises the reflector axis.

According to another embodiment of the invention, the light emitter is preferably embedded in an encapsulation material. Such a material protects the OLEDs of the light emitter mechanically and helps to collect all the emitted light. The encapsulation material may for example be an epoxy glue, a silicone and/or any other sufficiently thermally stable material with high transparency.

The lighting device preferably further comprises a controller which can selectively control the different colors of the light emitter to allow an adjustment of the color point or color temperature of the overall emission. The controller may be realized by independent control units as well as by a single control unit which can for instance put on different voltages to different panels of light emitters/OLEDs. The controller may for example control the amplitude of the applied bias as well as the pulse width of an applied pulsed bias, depending on whether the color point of the OLED element is sensitive to voltage changes.

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components.

Organic light emitting diodes (OLEDs) are ideal light sources for large surface luminant panels for illumination. Bottlenecks in the application of OLEDs for general illumination are however the non-directed light output (i.e. their diffused light) and the color mixing problem. In the following, a lighting device based on OLEDs is proposed with high brightness, tunable color, excellent color mixing (in comparison to not-organic light emitting diodes), and with directed light output, which could be used for many applications such as general and special illumination. The proposed lighting device uses two-dimensional OLED configurations, for instance OLED rings together with a collimator or a lens or/and a reflector to get a well-accepted light distribution with excellent color mixing.

Figure 1:
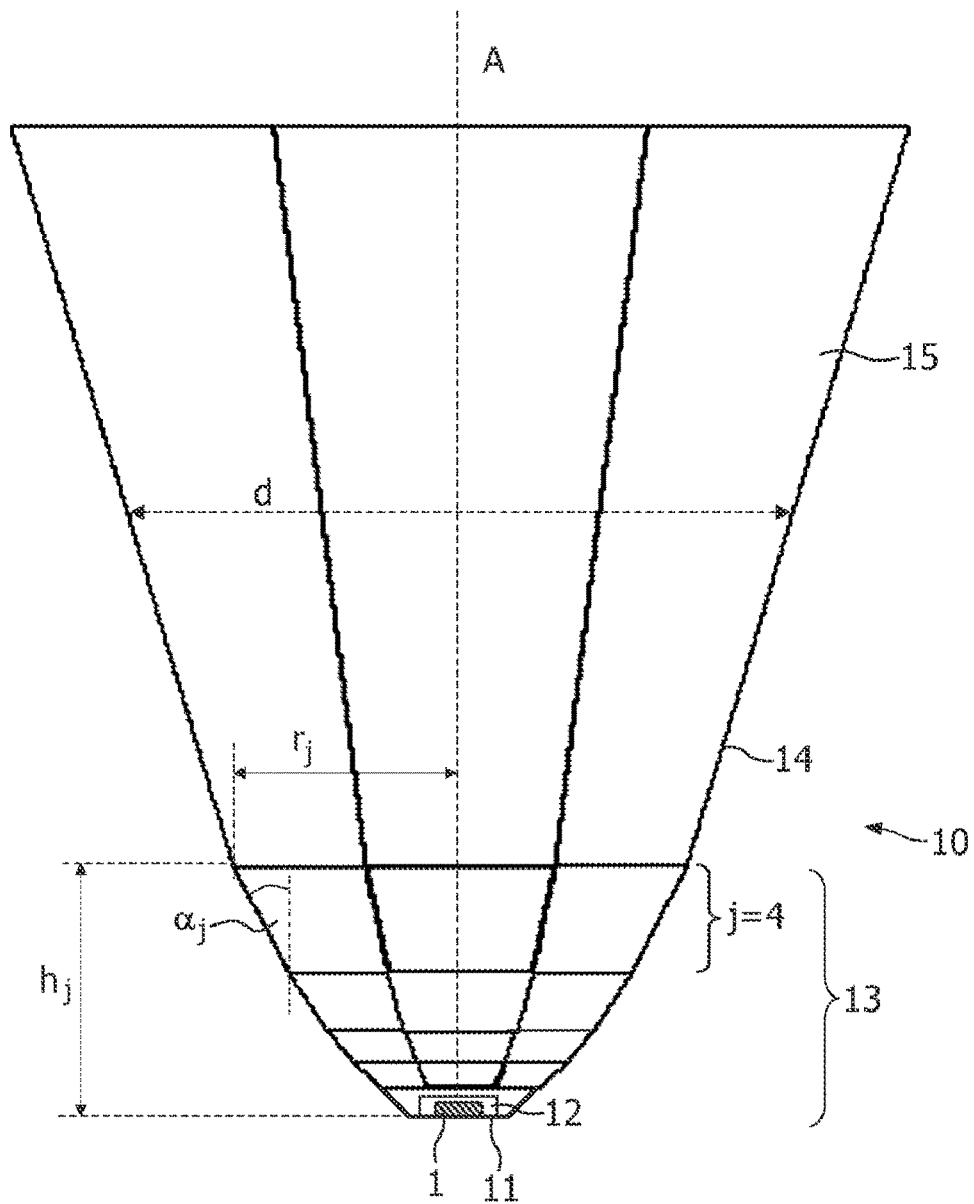
FIG. 1 shows a cross section along the optical axis through a lighting device according to the present invention, said lighting device having a collimator.
Figure 4:
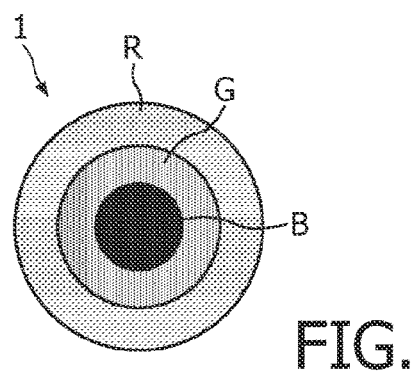
FIGS. 4 to 6 show different embodiments of a light emitter for a lighting device.
Figure 5:
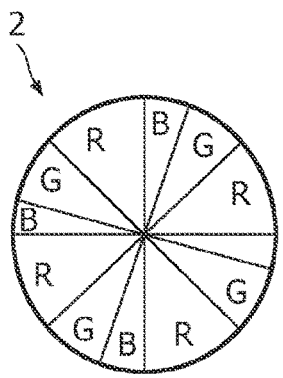
Figure 6:
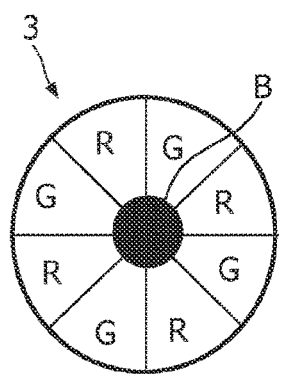

FIG. 1 shows a first embodiment of such a lighting device 10 in a section along its optical axis A. The lighting device 10 comprises three main components:

A light emitter 1 that is composed of OLEDs of different primary colors (for possible configurations see FIGS. 4 to 6).

Primary optics that is realized in the lighting device 10 by a dielectric collimator 13 disposed on a submount 11. A dielectric collimator is a collimator made of a dielectric material, e.g. PMMA or polycarbonate.

A reflector 14 that is for example mirror-coated on its inner surface and that has the general form of a tube which expands (degressively) with increasing distance from the primary optics 13 and the light emitter 1.

The mentioned components of the lighting device 10 are centered with respect to the optical axis A of the device. The cavity that may remain between the light emitter 1 and the primary optics 13 is optionally filled with an encapsulating material 12. Moreover, the reflector 14 is composed of planar trapezoidal facets 15, wherein eight facets (if the cross-section perpendicular to axis A is octagonal; if the cross-section is hexagonal, the number would be six facets) of identical shape are arranged in each of six belts, said belts being arranged one behind the other along the optical axis A. The facets 15 of each belt j (j=1, 2, . . . 6) are oriented at the same angle $\alpha_j$ with respect to the optical axis A. As shown in FIG. 1, the geometry of the facets 15 can uniquely be described by the height $h_j$ of their upper edge measured from the submount 11 in direction of the optical axis A and the distance $r_j$ of this upper edge from the axis A. For example, preferred geometrical parameters of the reflector are: $r_0$=3.24 mm, $r_1$=3.51 mm, $r_2$=4.52 mm, $r_3$=5.71 mm, $r_4$=7.32 mm, $r_5$=9.59 mm, $r_6$=19.02 mm, and $h_1$=0.19 mm, $h_2$=1.11 mm, $h_3$=2.55 mm, $h_4$=4.99 mm, $h_5$=9.43 mm, $h_6$=40.78 mm, wherein $r_0$ is the distance of the bottom edge of belt 1 from the optical axis A.

Figure 2:
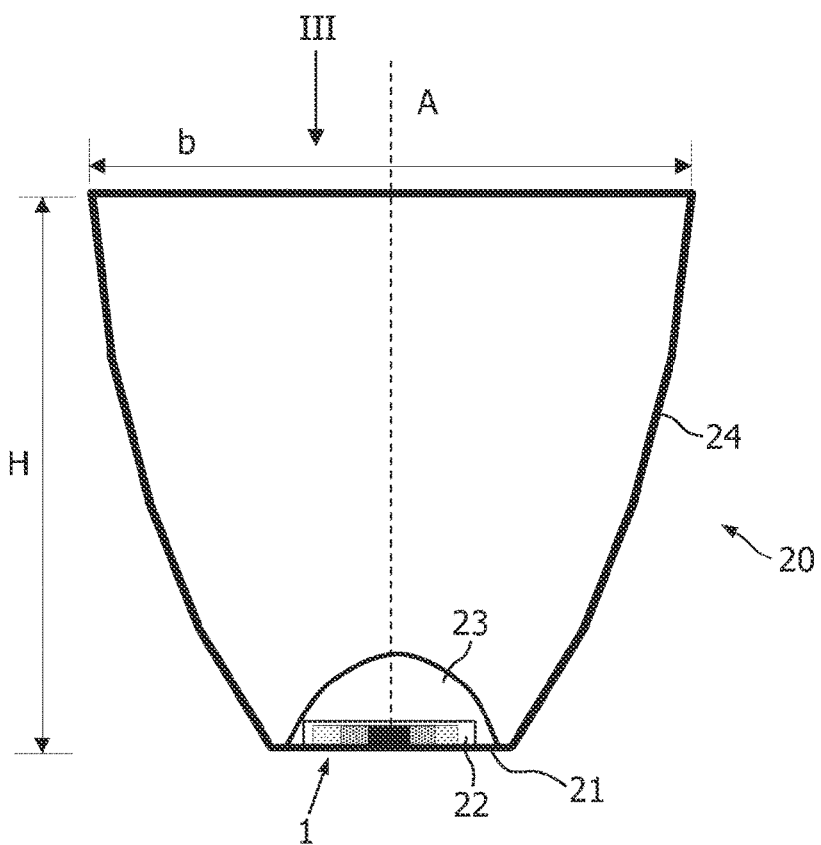
FIG. 2 shows a cross section along the optical axis through another lighting device according to the present invention, said lighting device having a lens.
Figure 3:
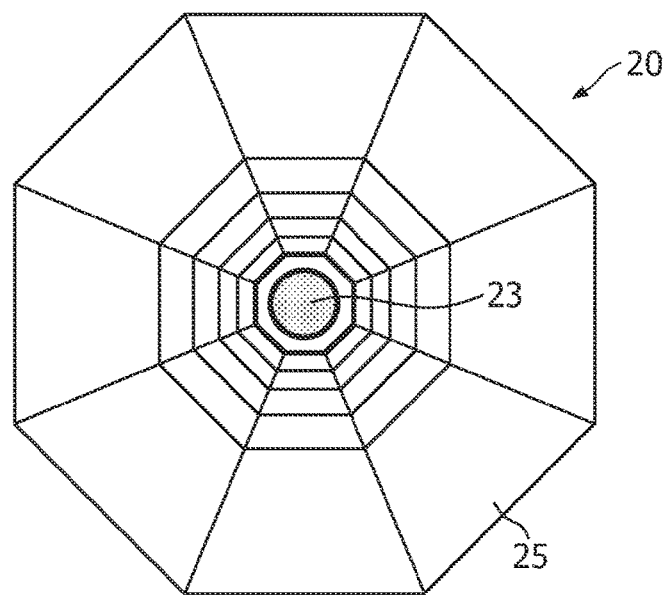
FIG. 3 shows a top view of the lighting device of FIG. 2.

FIG. 2 shows a second embodiment of a lighting device 20 according to the present invention, wherein the same components like that of FIG. 1 have been given the same reference numbers increased by 10 (i.e. the lighting device 20 comprises OLEDs 1, a submount 21, an encapsulation 22, a primary optics 23, a reflector 24, and facets 25). The difference of the lighting device 20 with respect to the lighting device 10 of FIG. 1 is that the primary optics consists of a lens, preferably a hemispherical lens 23, instead of a collimator. FIG. 3 shows this lens 23 in a top view (cf. arrow III in FIG. 2) of the lighting device 20.

In the two embodiments of a lighting device 10, 20 shown in FIGS. 1 to 3, light from the OLEDs is first "collimated" and mixed by primary optics (collimator/lens). Then the light is further collimated and mixed by secondary optics (reflector) that has been exclusively designed in order to obtain best color mixing in the angular distribution.

FIGS. 4 to 6 show possible OLED configurations of three different light emitters 1, 2 and 3 which might be used in the lighting devices 10, 20. In the first embodiment of a light emitter 1 shown in FIG. 4, the light emitter 1 is composed of concentric OLED rings R, G, B with monochromic colors or/and white colors with different color temperatures. Because for color mixing (to get white colors with different color temperatures), relative less blue light is needed (corresponding to a small surface area of the OLED here), one can put a blue OLED in the middle of other colors to get a good color mixing.

FIG. 5 shows an alternative light emitter 2 that is composed of sectors of OLEDs with different colors, wherein the colors red, green and blue occupy different areas R, G, B. Moreover, the primary colors are arranged in a periodic sequence R-G-B-R-G-B etc.

FIG. 6 shows a third configuration of a light emitter 3, wherein two primary colors (red and green) are arranged in sectors R, G like in FIG. 5, and wherein one color (blue) is disposed in the centre B of the light emitter 3.

Figure 7:
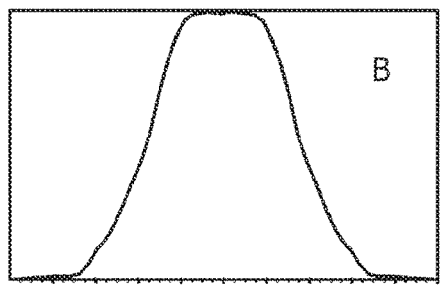
FIG. 7 shows the angular distribution of three different primary colors for a lighting device according to the present invention.
Figure 7:
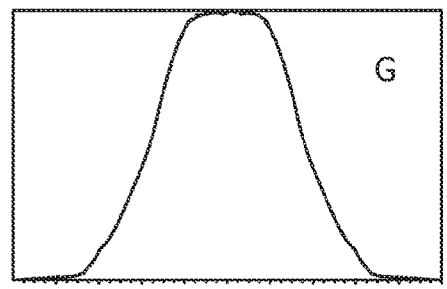
Figure 7:
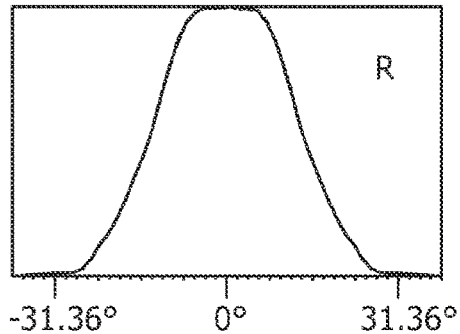

If the light emitter 1 of FIG. 4 is used in the lighting device 20 of FIG. 2, a spotlight distribution with 2×15 degrees is generated. The output distributions of blue, green and red light for said lighting device are shown in FIG. 7 (vertical axis: light flux per solid angle; horizontal axis: angle with respect to the optical axis A).

Figure 8:
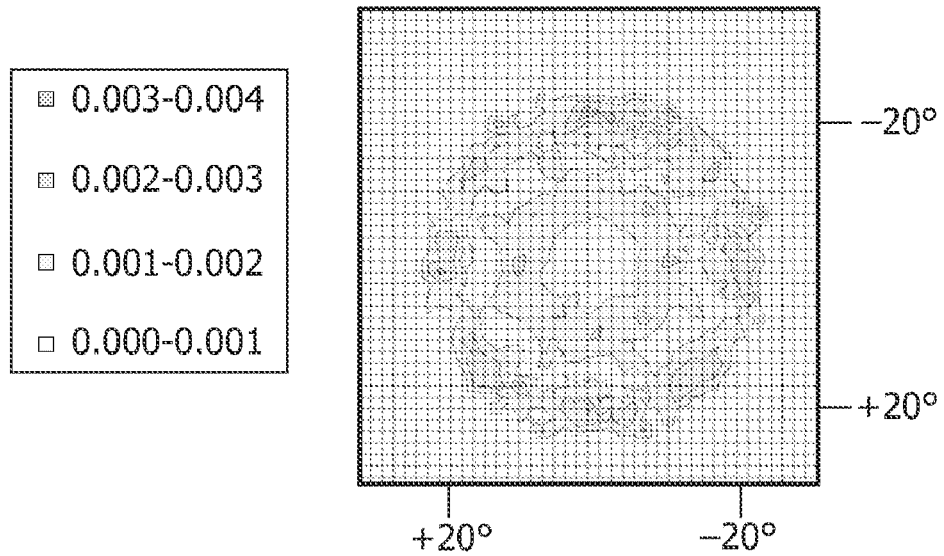
FIG. 8 shows the distribution of color variations in a plane perpendicular to the optical axis of a lighting device according to the present invention.

The lighting devices according to the present invention achieve an excellent color mixing. One possible description of color mixing quality is the value of Δu'v' (CIE-1976, Uniform Chromaticity Scale coordinates). The Δu'v' distribution of a lens-reflector combination (FIG. 1) is shown in FIG. 8. Most part of the Δu'v' distribution is smaller than 0.002. That means that the color difference is hardly perceived by human eyes. Only in a small region near an edge, Δu'v' is in a range of 0.003-0.004, which is much better than the Δu'v' by using non-organic light emitting diodes.

Figure 9:
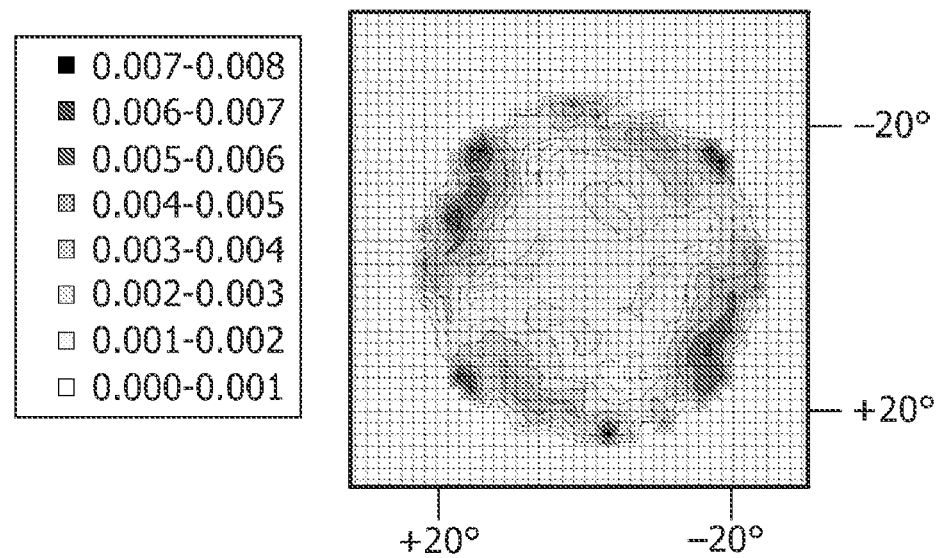
FIG. 9 shows the distribution of color variations in a plane perpendicular to the optical axis of a lighting device with anorganic LEDs.

The Δu'v' distribution for non-organic LED chips based on the same optics as in FIG. 8 is shown in FIG. 9. Because the configuration of OLED is much more flexible than non-organic LEDs, by using OLED as light source, the color mixing is much better than using non-organic light emitting diodes.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A lighting device comprising
   a light emitter comprising OLEDs of at least two different primary colors, the OLEDs being arranged in at least one of sectors and at least two concentric rings, wherein each ring of the at least two concentric rings includes OLEDs having only one color;
   primary optics for collimating and mixing light of the light emitter;
   a tapered tubular reflector with a diameter that increases from a narrow end to a wide end of the tapered tubular reflector, wherein the tapered tubular reflector is disposed with its narrow end adjacent to the primary optics.
2. The lighting device according to claim 1,
   wherein the light emitter comprises at least three OLEDs of different colors.
3. The lighting device according to claim 1,
   wherein the light emitter comprises a blue OLED in a centre of the light emitter.
4. The lighting device according to claim 1,
   wherein the diameter of the light emitter is larger than 1 mm.
5. The lighting device according to claim 1,
   wherein the light emitter covers a circular area.
6. The lighting device according to claim 1,
   wherein each sector of the sectors including OLEDs having only a single color.
7. The lighting device according to claim 1,
   wherein the primary optics comprises a collimator or a lens.
8. The lighting device according to claim 1,
   wherein the cross section of the tapered tubular reflector taken perpendicular to its axis has the form of a regular polygon.
9. The lighting device according to claim 1,
   wherein the tapered tubular reflector is composed of planar facets.
10. The lighting device according to claim 1,
    wherein the facets are arranged in belts around the axis of the tapered tubular reflector.
11. The lighting device according to claim 1,
    wherein a height of the belts increases from the narrow end to the wide end of the tapered tubular reflector.
12. The lighting device according to claim 1,
    characterized in that the angle between the facets and the axis of the tapered tubular reflector ranges between 10° and 60°.
13. The lighting device according to claim 1,
    characterized in that the angle between the facets and the axis of the tapered tubular reflector decreases from the narrow end to the wide end of the tapered tubular reflector.
14. The lighting device according to claim 1,
    characterized in that the light emitter is embedded in an encapsulating material.
15. The lighting device according to claim 1,
    characterized in that it comprises a controller for selectively controlling the different colors of the light emitter.

* * * * *